US009685806B2

(12) United States Patent
Bencuya

(10) Patent No.: US 9,685,806 B2
(45) Date of Patent: Jun. 20, 2017

(54) POWER CONNECTOR WITH LOAD CURRENT SENSING

(71) Applicant: Izak Bencuya, Saratoga, CA (US)

(72) Inventor: Izak Bencuya, Saratoga, CA (US)

( * ) Notice: Subject to any disclaimer, the term of this patent is extended or adjusted under 35 U.S.C. 154(b) by 132 days.

(21) Appl. No.: 14/538,782

(22) Filed: Nov. 11, 2014

(65) Prior Publication Data

US 2015/0137770 A1 May 21, 2015

Related U.S. Application Data

(63) Continuation-in-part of application No. 14/494,563, filed on Sep. 23, 2014.

(60) Provisional application No. 61/904,526, filed on Nov. 15, 2013.

(51) Int. Cl.
*H02J 7/02* (2016.01)
*H02J 7/00* (2006.01)
*H01R 13/66* (2006.01)
*H01R 13/703* (2006.01)

(52) U.S. Cl.
CPC .......... *H02J 7/0045* (2013.01); *H02J 7/0031* (2013.01); *H02J 7/0042* (2013.01); *H01R 13/6683* (2013.01); *H01R 13/7037* (2013.01); *H02J 7/0047* (2013.01); *H02J 2007/0049* (2013.01)

(58) Field of Classification Search
CPC .............. H01R 13/633; H01R 13/6633; H01R 13/6683; H02J 7/0031; H02J 7/0042; H02J 7/0045; H02J 7/0047
USPC .................. 320/111, 162, 163; 439/152, 159; 307/131
See application file for complete search history.

(56) References Cited

U.S. PATENT DOCUMENTS

| 5,266,040 | A | 11/1993 | Merrill et al. | |
|---|---|---|---|---|
| 5,800,189 | A | 9/1998 | Ahmed | |
| 5,831,802 | A | 11/1998 | Ahmed et al. | |
| 6,540,533 | B1 | 4/2003 | Schreiber | |
| 2007/0258177 | A1 | 11/2007 | Galang et al. | |
| 2010/0008004 | A1 | 1/2010 | Galang et al. | |
| 2010/0201208 | A1* | 8/2010 | Berghegger | H02J 9/005 307/125 |
| 2011/0254383 | A1* | 10/2011 | Franz | H02J 7/02 307/131 |

(Continued)

OTHER PUBLICATIONS

PCT, International Search Report and Written Opinion of the International Searching Authority for International Application No. PCT/US2014/065578, Apr. 6, 2015, 11 pages.

(Continued)

*Primary Examiner* — Edward Tso
*Assistant Examiner* — Aaron Piggush
(74) *Attorney, Agent, or Firm* — Halit N. Yakupoglu

(57) ABSTRACT

A power connector for use in charging a battery of a device is provided. The power connector has an electromagnetic switch having terminals used to supply power from an external power source to a power adapter which is connected to the battery of the device. A power sensing circuit is coupled between the terminals of the electromagnetic switch and the power adapter, wherein the electromagnetic switch is configured to shut off power supplied to the power adapter when the power sensing circuit detects that the battery is fully charged. A reset mechanism is configured to mechanically activate the electromagnetic switch to start supplying power to the power adapter.

17 Claims, 7 Drawing Sheets

(56) References Cited

U.S. PATENT DOCUMENTS

2013/0257442 A1    10/2013    Tang

OTHER PUBLICATIONS

Power Integrations, Inc.; Introduction to Green Power; San Jose, CA; Jan. 2012; (www.powerint.com).
Lawrence Berkeley National Laboratory; Standby Power; Defining and Measuring Standby; Berkeley, CA; Dec. 2008; (standby.lbl.gov/measure.html).

* cited by examiner

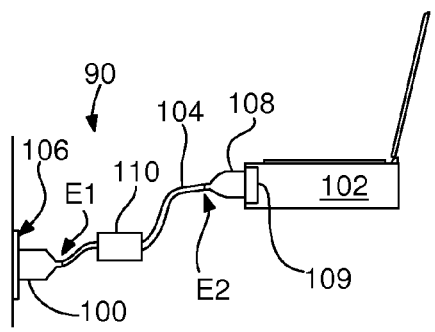 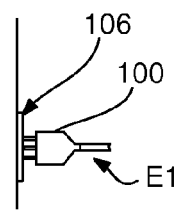 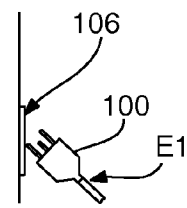
FIG. 1A  FIG. 1B  FIG. 1C
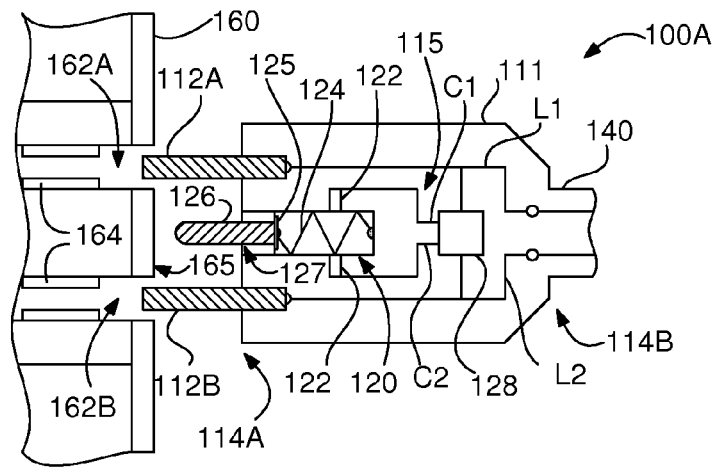
FIG. 2A
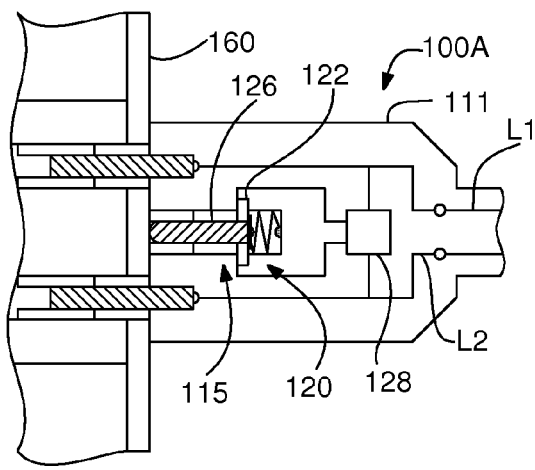
FIG. 2B

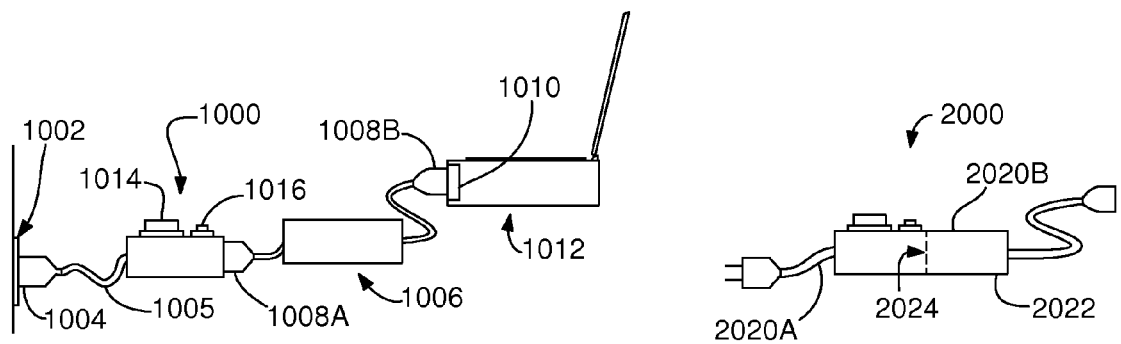
FIG. 9A
FIG. 9B
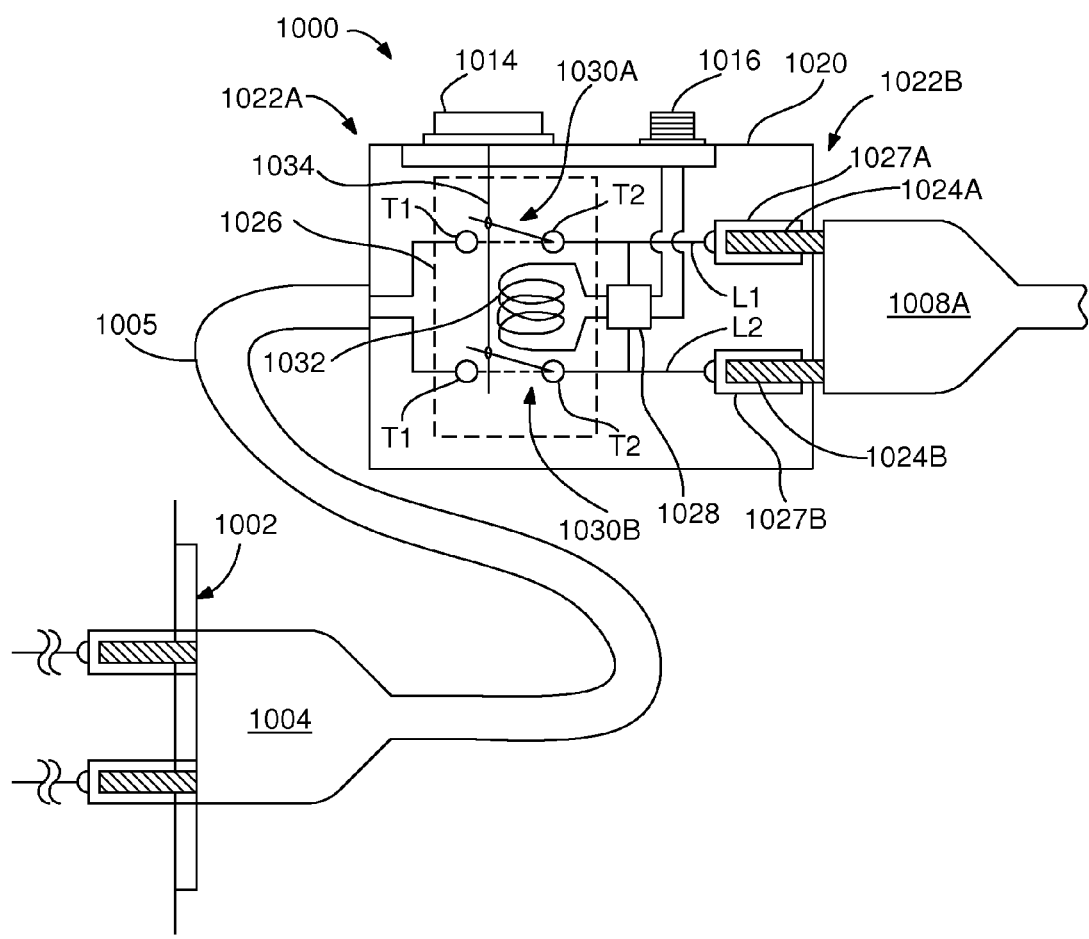
FIG. 10A

POWER CONNECTOR WITH LOAD CURRENT SENSING

RELATED APPLICATIONS

This application is a Continuation-in-Part of U.S. patent application Ser. No. 14/494,563, entitled "Self Unplugging Power Plug with Load Current Sensing" filed on Sep. 23, 2014, and this application relates to and claims priority from U.S. Provisional Patent Application Ser. No. 61/904,526 entitled "Self Unplugging Power Plug with Load Current Sensing" filed on Nov. 15, 2013, both of which are expressly incorporated by reference herein in their entirety.

BACKGROUND

Field of the Invention

The present invention relates to electrical power connectors and adapters used to charge batteries and, more specifically, to electrical power connectors and power adapters with built-in functions for shutting off power in response to a power change.

Description of the Related Art

The introduction of mobile or portable computing and communication devices is rapidly changing our information society. Laptops or smart-phones equipped with wireless technologies allow users to communicate with other users, accomplish their tasks, accessing and sharing information sources anytime and anywhere. It is expected that the total number of mobile device users will continue to grow significantly with this trend especially in developing countries.

Mobile devices such as portable laptop computers, cell phones, tablet devices or the like are rechargeable battery powered devices, which are often equipped with power adapters or chargers. Power adapters can convert AC power to DC power which is needed to charge the rechargeable batteries. Power adapters can also be designed as special plugs to plug into a wall power outlet. It is often very inconvenient and tedious activity for a mobile device user to routinely remove such charger plugs from wall outlets, for example, when the mobile device is charged or the user wants to leave that location. In such situations, the users often attempt to pull the cord in order to quickly remove the plug from the socket.

However, such pulling of the plug from a socket often damages electrical cords and plugs rendering them useless in a short usage time. Furthermore, such devices requiring a power adapter continue consuming power once connected to a wall outlet, whether or not the power adapter is connected to the device with the rechargeable batteries. In this respect, even if the batteries are fully charged such devices keep drawing a trickle of standby power, typically, in the range of 200 to 900 milliwatt (mW). Standby power is defined as the power consumed while products are turned off or otherwise performing no useful function. According to a research conducted by Lawrence Berkeley National Laboratory (LBNL), about 10% of a typical residential electric bill is spent on standby power. Most electronic products continue to consume power unless they are unplugged. Particularly, if the devices using adapters are left connected to a power outlet, the adapters continuously get warm even if they are not used by the devices because they continuously draw and use standby power by converting it to heat energy.

Many existing chargers or other devices sold in the consumer market reduce stand-by power electronically but they still have measurable energy consumption, typically a consumption of less 300 mW. This is undesirable from the power consumption standpoint; therefore, power management is a critical consideration in mobile device design. The LBNL study recommends unplugging small appliances if they are not used for a prolonged period. The continuous power consumption of portable devices after the battery is fully charged also has a very detrimental effect on battery life and the batteries become incapable of holding charge after a few months. As such, considering the above mentioned popularity of rechargeable battery powered devices nowadays, even a partial solution to this unnecessary energy consumption can have major economic benefits.

Thus, it will become readily apparent that it would be highly desirable to provide the mobile devices with a charger auxiliary or enhancement having the capability of shutting off power when the charging is complete or when the user wants to relocate the charger auxiliary or enhancement.

SUMMARY OF THE INVENTION

The present inventions are related to power connectors for mobile devices.

One aspect of the present invention includes an electromechanical connector for use in charging batteries of devices. The electromechanical connector comprises an electromagnetic switch having terminals used to supply power from an external power source to a power adapter which is connected to a battery of a device, a power sensing circuit coupled between the terminals of the electromagnetic switch and the power adapter, wherein the electromagnetic switch is configured to shut off power supplied to the power adapter when the power sensing circuit detects an indication that the battery is fully charged, and a reset mechanism configured to mechanically activate the electromagnetic switch to start supplying power to the power adapter.

Another aspect of the present invention includes a system for supplying electrical power to a device having a battery. The system comprises a connector supplying power from an external power supply to a power adapter to charge the battery within the device an electromagnetic switch within the connector, the electromagnetic switch being configured to shut off power received by the power adapter when the electromagnetic switch is deactivated, a control circuit within the connector, the control circuit being configured to deactivate the electromagnetic switch when the control circuit detects a reduction in power from a first power value to a second power value, the reduction in power indicating that the battery is fully charged, and a reset mechanism of the connector to activate the electromagnetic switch to supply power to the power adapter when the battery needs to be charged.

Yet another aspect of the present invention includes a method for supplying electrical power to a device having a battery. The method comprises charging the battery by a power adapter external to the device, wherein the power adapter is supplied power by a connector located between an external power source and the power adapter, detecting a reduction in power received by the battery using a power sensing circuit located within the connector, the reduction in power indicates that the battery is fully charged, deactivating an electromagnetic switch within the connector in response to the reduction in power so as to disconnect power adapter from external power source, and mechanically activating the electromagnetic switch so as to connect the power adapter to the power source.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIG. 1A-1C is an illustration of a portable device connected to an electrical outlet by an electrical cord using an embodiment of a power connector of the present invention;

FIG. 2A-2B is a schematic view of an embodiment of a power connector of the present invention;

FIG. 9A is a schematic illustration of an embodiment of a power connector supplying power from an external power source to a charge adapter which is used to charge batteries of a device;

FIG. 9B is a schematic illustration of an embodiment of a power connector of the present invention, wherein the power connector has been integrated with a charge adepter device in a power connector housing;

FIG. 10A is a schematic illustration of an embodiment of a power connector including an electromagnetic switch electrically connected to a current sensing circuit;

DETAILED DESCRIPTION OF THE PREFERRED EMBODIMENTS

Figure 3:
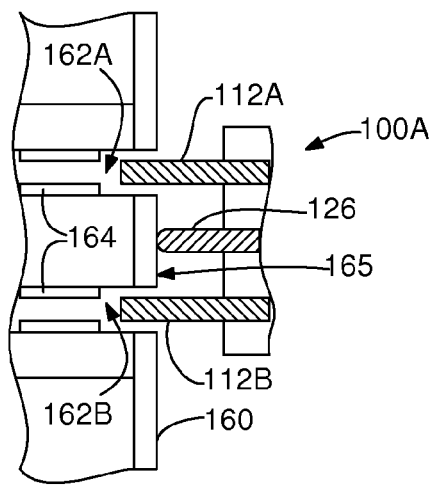
FIG. 3 is a partial schematic view of a power connector of the present invention.

The present inventions provide electromechanical power managers for electronic devices using power adapters or chargers. In one embodiment, an electromechanical power manager may comprise a self unplugging power connector such as a self unplugging power plug or a self unplugging power plug adapter which can unplug automatically from an electrical outlet by means of a mechanical action when the electrical current required from the load, such as a rechargeable battery unit, gets lower than a predetermined level for a predetermined period of time.

The self unplugging power connector of the present invention may be used for mobile or portable devices using rechargeable battery power and/or power adapters, such as laptop computers, cell phones, smart phones, tablet devices, notebook computers and the like, which can be plugged in and out multiple times in many locations. The self unplugging power connector may establish a mechanical separation from the electrical socket and no effort needs to be made by a user, such as pulling it out to unplug it, and thereby the self unplugging power connector is not damaged during unplugging action. Alternatively, when the self unplugging power connector of the present invention is used to charge the rechargeable batteries of a device and left plugged by a user, the self unplugging power connector may automatically be disconnected from the electrical socket when a current reduction due to the charged battery is sensed by the self unplugging power connector. The self unplugging power connector may be used with a power charger or power adapter to charge the batteries of the device. Alternatively, the self unplugging power connector may be a self unplugging adapter plug for a power charger or power adapter to charge the batteries of the device. The self unplugging action shuts off power supplied from the power outlet to the power adapter which is used to charge the batteries of the device, thereby prevents any standby power losses. This feature along with other benefits eliminates the standby power consumption and provides significant power management advantages. As explained above, most mobile devices continue to consume power or standby power unless they are unplugged. Power adapters or chargers of the devices continuously draw standby power and burn it off as heat, if they are left connected to a power outlet.

Accordingly, a host circuitry within the self unplugging power connector may activate the unplugging action of the self unplugging power connector in response to a detected current reduction caused by a charged battery, and thereby prevents any standby power consumption. The self unplugging action of the self unplugging power connector withdraws its prongs from the electrical socket, such as a conventional wall socket into which the prongs have been inserted, thereby terminating the self unplugging power connector's electrical connection with the power network. As will be described below, the unplugging action of the self unplugging power connector is caused by a release member that is activated or ejected by an activation member controlled by the host circuitry of the self unplugging power connector. When activated, the release member, which is nested within the power connector, pushes against an outer surface of the socket by moving forward, and thus causes the withdrawal of the prongs from the socket receptacles while pushing the power connector body away from the socket.

FIG. 1A shows an exemplary power charger unit 90 including a self unplugging power connector 100, or a first connector, of the present invention. The charger unit 90 may also include a power convertor or adapter 110 attached to an electrical line 104, or cord or cable, to provide power for charging batteries of an exemplary mobile device 102, such as a laptop computer, from a wall electrical outlet 106. The self unplugging power connector 100 may be attached to a first end E1 of the electrical line 104. As will be appreciated, the exemplary self unplugging power connector 100 may also be designed as a power adapter or charger for a mobile phone, tablet device or the like, and it is within the scope of this invention. As will be described below, the self unplugging power connector 100 is configured to function as an external power manager capable of terminating current withdrawal through the charger unit 90 once a predetermined current reduction is detected by the self unplugging power connector 100. Attached to a second end E2 of the electrical line 104 is a device connector 108, or a second connector, which can be connected to a power port 109 of the mobile device 102 so as to provide current for the rechargeable batteries (not shown) of the mobile device via the power adapter 110. The power converter (AC/DC power converter) or power adapter 110 converts the power received from the power outlet 106 and supply the converted power to the mobile device 102 to charge the rechargeable batteries. However, as explained above, in the prior art systems, when power adapters are left plugged into the power outlets, such power adapters still consume power as standby power. As shown in FIGS. 1B and 1C respectively, with the self unplugging action of the present invention, the self unplugging power connector 100 may be either partially or fully withdrawn from the wall outlet 106 while it is fully disconnected from the power network, and thereby prevents any standby power use by the power adapter 110. Exemplary self unplugging power connector embodiments are described below.

Self unplugging power connectors exemplified in the below embodiments may be for example: (a) self unplugging power (electrical) plugs to connect mobile devices to power networks; (b) self unplugging power adapters that may be used to connect power plugs or plugs of the mobile devices to power networks; and, (c) self unplugging power adapters/converters of the mobile devices that convert power for the mobile device. Self unplugging power connectors described in the following embodiments of the invention will be referred to as power connectors.

FIGS. 2A-2B show an embodiment of a power connector, such as a power plug 100A having a housing 111 including at least two electrical contacts 112A and 112B, or prongs as often referred to, at a first end 114A of the housing, to be inserted into corresponding holes 162A and 162B, or receptacles of an exemplary electrical outlet 160. Inside the holes 162A and 162B, there are receptacle contacts 164 connecting the outlet 160 to a power network (not shown). An electrical line 140 is connected to a second end 114B of the housing, and electrical wires L1 and L2 of the electrical line 140 are extended through an inner space 115 of the housing 111 and connected to the electrical contacts 112A and 112B in a known manner, for example, as shown in FIGS. 2A-2B. As described above in FIGS. 1A-1C, the power plug 100A may be an integral part of a power charger unit, such as the power charger unit 90. The electrical line 140 may connect the power plug 100A to the mobile device 102 through the power adapter 110 or charger as described above. However, other components of the power charger unit 90 such as the electrical line 104, power adapter 110 or charger and the device connector 108 are not shown for clarity in FIGS. 2A-2B. Preferably, built in the inner space 115, the housing 111 includes an activation member 120, a release member 126 and a current sensing circuit 128. A spring 124 of the activation member 120 is attached to an end plate 125 of the release member 126. In this embodiment, the activation member 120 may comprise an electro-mechanical latch 122 (the latch 122, hereinafter). The latch 122 may be electrically connected to the current sensing circuit 128 with lines C1 and C2 to control the operation of the latch. The current sensing circuit 128 may be in turn electrically connected to the electrical wires L1 and L2 so as to track the power drawn by the mobile device 102 (FIG. 1A). The primary responsibilities of the current sensing circuit 128 are both tracking the current drawn through the power plug 100A and controlling the activation member 120.

As will be described below, when the power plug 100A is in a plugged-in state, the release member 126 may be in a retracted position within the housing 111 as shown in FIG. 2B. When activated by the activation member 120, the release member 126 may advance outside the housing 111 through a hole 127 and disengage the power plug 100A from the outlet 160 as shown in FIGS. 2A and 3. Referring to FIGS. 2A-2B, in this embodiment, the release member 126 may cooperate with the spring 124 in such a way that as the electrical contacts 112A and 112B of the power plug 100A are inserted into the outlet 160, the release member 126 is pushed backwardly by a surface 165 of the outlet 160 and fully compresses the spring 124. The latch 122 catches the end plate 125 with a mechanical action and keeps the release member 126 in a retracted position while biased by the spring 124. As soon as the power plug 100A is placed into this plugged-in state, for example, to charge a mobile device, the current sensing circuit 128 begins tracking the current flow from the outlet to the mobile device, and deactivates the latch 122, i.e., opens it, if a drop in current flow is detected. As shown in FIG. 3 with a partial view of the power plug 100A, when released by the latch 122, decompressing action of the spring 124 moves the release member 126 forward against the surface 165 of the outlet 160 and automatically separates, or self unplugs, the power plug 100A from the outlet 160, thereby disconnecting the current flow. The same process may be repeated many times by a user by plugging in the power plug and thereby pushing in the release member, and letting it self unplug with the action of the release member when the current to the load stops either if the load is taken away or the charging of a battery is completed, and thereby prevents any standby power use, for example, by the power adapter 110 (FIG. 1A).

In this and the following embodiments, the release member 126 may comprise a pin or a multitude of pins, preferably shaped as a round pin and most likely positioned between the electrical connectors 112A and 112B for best symmetric mechanical force to push the plug out of the wall socket. The pin may be a rigid metallic material, preferably a magnetisable or magnetic material. The pin may be coated with a polymer or another coating material. The pin material must be a durable and strong material to stay rigid. The tip of the pin that touches the outlet surface may be made of a polymer while the rest of the pin may be a magnetisable or magnetic material. The current sensing circuit 128 may be assembled on a printed circuit board and will fit into the power plug housing 111. The current sensing circuit 128 may be a control circuit with a current sensor and a time delay (not shown). The current sensing circuit 128 is powered by the electricity from the wall socket. The current sensing circuit 128 may be powered by AC power which may be converted to DC power in order to compare the load current to predetermined threshold levels or to the levels preset by an external adjustment knob or a thumbwheel.

In this embodiment, a time delay function may also be associated with the electromechanical latch 122 so that the release member 126 may be ejected in a slower manner by controlling the mechanical action of the spring 124. The time delay can be built by designing the spring 124 with a predetermined inertia or spring constant, which affects the speed of the release member 126 and hence the power plug 100A being ejected. The spring 124 with the predetermined inertia and the spring constant may be manufactured from a metallic spring material or hard polymer spring material. The release speed of the power plug 100A or the release member 126 may alternatively be enhanced and adjusted by additional mechanical friction created for the release member as it is released, for example by establishing friction between the hole 127 and the release member 126 by including a high friction material within the hole 127 and/or around the release member 126, such as a felt layer or a polymer layer. Accordingly, a power plug ejection or release speed may be less than about 5 cm/s, or in a range of about 0.1-1 cm/s or about 0.1-0.2 cm/s.

Figure 4A:
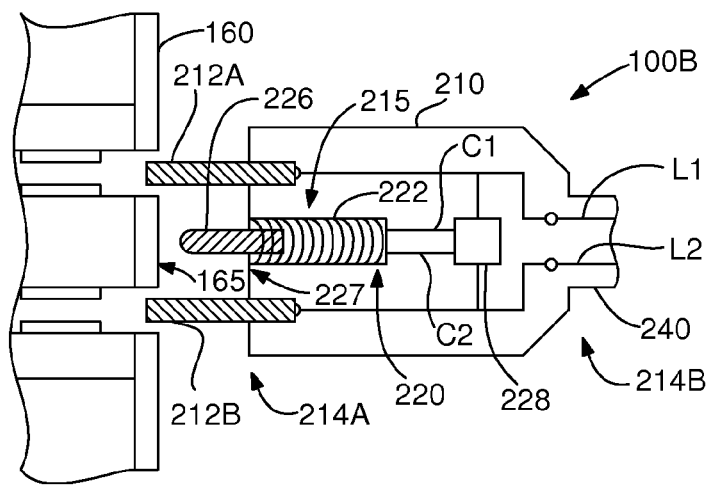
FIG. 4A-4B is a schematic view of another embodiment of a power connector of the present invention.
Figure 4B:
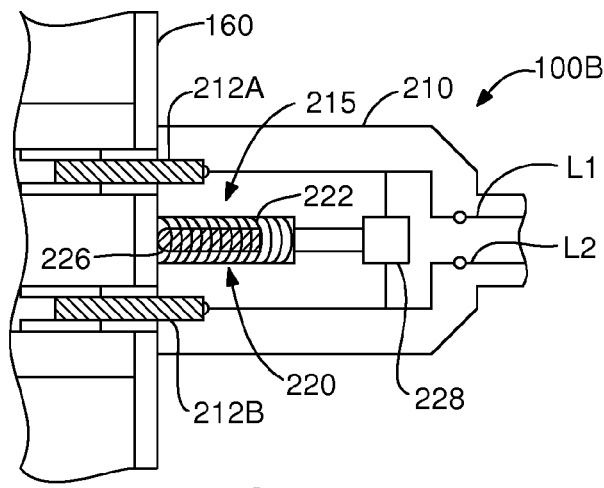

FIGS. 4A-4B show another embodiment of a power connector, such as a power plug 100B of the present invention. As in the previous embodiment, the power plug 100B includes a housing 210 with at least two electrical contacts 212A and 212B, at a first end 214A of the housing, to be inserted into the electrical outlet 160. An electrical line 240 is connected to a second end 214B of the housing 210. Electrical wires L1 and L2 of the electrical line 240 are extended through the inner space 215 of the housing 210 and connected to the electrical contacts 212A and 212B. As described above in FIGS. 1A-1C, the power plug 100B may be an integral part of a power charger unit, such as the power charger unit 90. The electrical line 240 may connect the power plug 100B to a mobile device through the power adapter 110 or charger as described above. However, other components of the power charger unit such as the electrical line 104, power adapter 104 or charger and the device connector 108 described with respect to FIGS. 1A-1C are not shown for clarity in FIGS. 4A-4B. In the inner space 215, the housing 210 includes an activation member 220, a release member 226 and a current sensing circuit 228. The current sensing circuit 228 is connected to the electrical wires L1 and L2 and tracks the current drawn through the power plug 100B and controls the activation member 220.

In this embodiment, the activation member 220 may comprise a solenoid 222 that is electrically connected to the current sensing circuit 228 with electrical lines C1 and C2. The release member 226 may be positioned within the hollow space of the solenoid 222 so as to move the release member 226 with the electromagnetic action. When the power plug 100B is in plugged-in state, the release member 226 is in the retracted position within the solenoid 222. As soon as the current sensing circuit 228 detects a drop in current flow to the mobile device, the current sensing circuit activates the solenoid 222, and the resulting electromagnetic action moves the release member 226 through a hole 227 and forwardly against the surface 165, thus automatically separating the power plug 100B from the electrical outlet 160, and thereby prevents any standby power use, for example, by the power adapter 110 (FIG. 1A). In this embodiment, a time delay function may also be associated with the solenoid 222 so that the release member 226 may be ejected in a slower manner through the hole 227 by controlling the electromagnetic action of the solenoid 222 by a time delay circuit (not shown) included in the current sensing circuit 228. This way release speed of the release member 226 and hence the power plug 100B is slowed down and the power plug 100B comes out gently and slowly. The release speed of the power plug 100B or the release member 226 may alternatively be enhanced and adjusted by additional mechanical friction created for the release member 226 as it is released, for example by establishing friction between the hole 227 and the release member 226 by including a high friction material within the hole 227 and/or around the release member 226, such as a felt layer or a polymer layer. Accordingly, a power plug ejection or release speed may be less than about 5 cm/s, or in a range of about 0.1-1 cm/s or about 0.1-0.2 cm/s.

The current sensing circuit may have an adjustable current level as well as an adjustable timing delay for the activation of the release member when the activation member includes either the electro-mechanical latch 122 (FIGS. 2A-2B) or the solenoid 222 (FIGS. 4A-4B).

Figure 5:
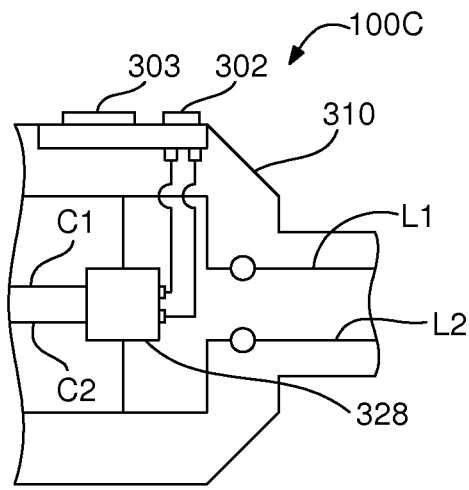
FIG. 5 is a schematic partial view of an embodiment of a power connector of the present invention including a time delay system.

As shown in FIG. 5, in a partial view, a current sensing circuit 328 of an exemplary power plug 100C may be connected to a time switch 302 or an enable/disable switch and a current adjustment switch 303 built on a housing 310 of the power plug 100C. The current sensing circuit 328 may be connected to an activation member including either an electromechanical latch or a solenoid, as exemplified above in FIGS. 2A, 2B, 4A and 4B, with lines C1 and C2. The time switch 302 may be used to enable or disable the power plug as well as used to enable or disable the current sensing circuit 328 for preset time periods for keeping the power plug plugged in for special circumstances, for example, for charging the batteries. The current adjustment switch 303 may be used to preset a current range for the current sensing circuit 328 to activate the self unplugging of the power plug 100C at the preset current level.

Figure 6A:
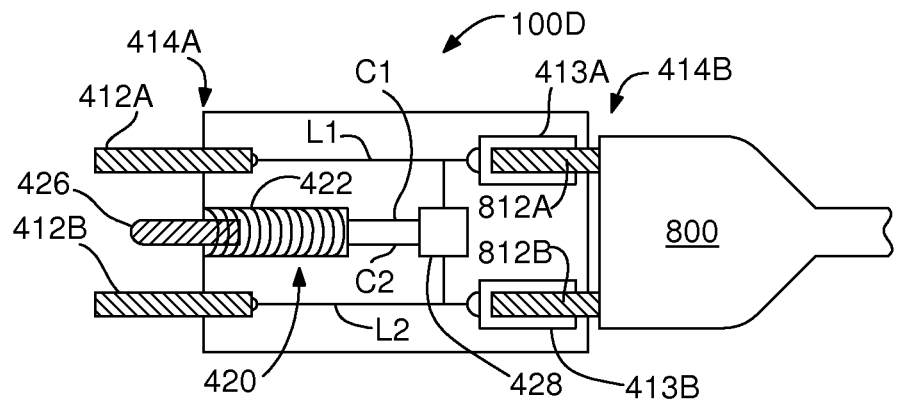
FIG. 6A-6B are schematic views of an embodiment of an adapter power connector of the present invention.

The principles of the present invention may be used to manufacture power plug adapters and other auxiliary devices which can be configured to be used directly or indirectly with mobile devices. Differing from the previous embodiments shown in FIGS. 2A-4B, the power plug adapters shown in the following embodiments may be used with conventional chargers including power converters or adapters. A conventional charger may be plugged into the self unplugging power plug adapters of the present invention so that when the power plug adapter self unplugs, the current flow to the charger or adapter plugged into the power plug adapter stops, thereby prevents any standby power use by the power charger. FIG. 6A shows a power connector, such as an exemplary power plug adapter 100D to provide the above described self unplugging function when used as an adapter of an exemplary plug 800 or a power converter. The exemplary plug 800 may be a plug of a portable computer power cord including a power adapter. The exemplary plug 800 may also be an adapter or a power converter of a mobile phone, portable computer or the like. The power plug adapter 100D may be manufactured using the method of any one of the above embodiments and thus functions the same way. For example, the power plug adapter 100D may include an activation member 420, a release member 426 and a current sensing circuit 428 as described in the above embodiments. In this embodiment, the activation member 420 may comprise a solenoid 422 housing the release member 426 as described above. A first end 414A of the adapter 100D includes the electrical connectors 412A and 412 B, and a second end 414B at least two receptacles 413A and 413B to receive the corresponding electrical connectors 812A and 812B of the plug 800.

Figure 6B:
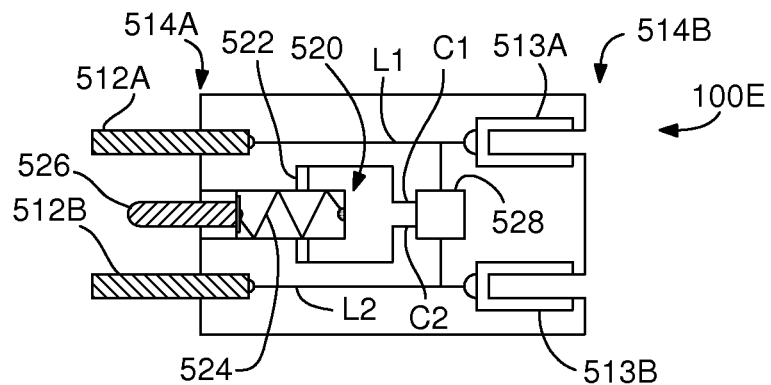

FIG. 6B shows another exemplary connector, such as a power plug adapter 100E to provide the above described functions when used as an adapter for the plug 800 (FIG. 6A) or a power converter. The power plug adapter 100E may be manufactured using the method of any one of the above embodiments and thus the self unplugging action functions the same way. For example, the power plug adapter 100E may include an activation member 520, a release member 526 and a current sensing circuit 528. In this embodiment, the activation member 520 may comprise electro-mechanical latch 522 including the release member 526 and a spring 524 as described above. A first end 514 A of the power plug adapter 100E includes the electrical connectors 512A and 512B, and a second end 514B at least two receptacles 513A and 513B to receive the corresponding electrical connectors 812A and 812B of the exemplary plug 800 shown in FIG. 6A.

Figure 7A:
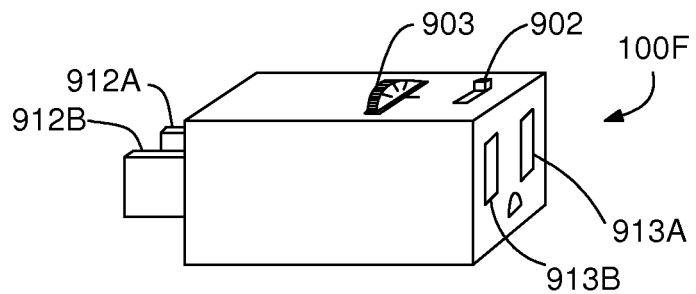
FIGS. 7A-7B are schematic views of an embodiments of an adapter power connector of the present invention.
Figure 7B:
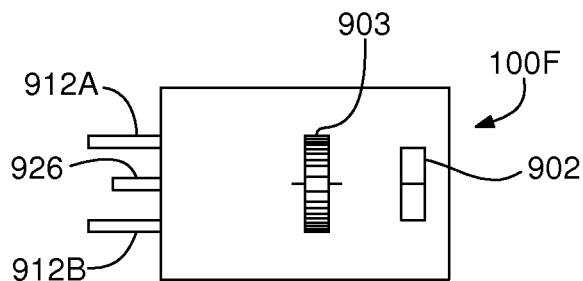

In FIG. 7A in perspective view and in FIG. 7B in top view, an exemplary power connector, such as a power plug adapter 100F is shown. The power plug adapter 100F includes electrical connectors 912A and 912B to be connected to a power outlet (not shown), and at least two receptacles 913A and 913B to receive the electrical connectors or prongs of a plug or an adapter (not shown). The power plug adapter 100F may be manufactured using the method of any one of the above described power plug adapters 100D or 100E (FIGS. 6A and 6B) and thus the self unplugging functions the same way. The power plug adapter 100F may include a time switch 902 or enable/disable switch to enable or disable its current sensing circuit for preset time periods for keeping the power adapter plugged in for desired operations, for example, for charging the batteries of a mobile phone. The switch 902 enables or disables the power plug adapter's functions and also allows the user to set a predetermined operation time. At the end of this predetermined time, such as 2 hours or 3 hours, the power plug adapter 100F self unplugs by the activation member or release mechanism as described in the above embodiments. The power plug adapter 100F may also include an adjustment switch 903 to preset a current range to activate the unplugging of the power plug adapter 100F. The adjustment switch 903 may be a thumbwheel or a knob with marked current ranges. The power plug adapters shown in FIGS. 6A-7B, an ejection or release speed may be less than about 5 cm/s, or in a range of about 0.1-1 cm/s or about 0.1-0.2 cm/s.

For all the power connector embodiments above, a typical range of power reduction for the activation of the self unplugging function may be in the range of about 10-500 mW, about 30-500 mW, or about 10-50 mW, depending on the appliance and charging current. For example, if a current needed to charge the rechargeable batteries on a device is a first current having X amperes, a reduced current or a second current having Y amperes, which is detected by the current sensing circuitry to activate the unplugging operation, may be of about less than 100% of the first current value X, or in the range of about 1%-10% of the first current value X. Power connectors with a predetermined activation power value to self unplug may be designed in for dedicated products, such as laptops or mobile phones. Such power connectors self unplug when the predetermined power value or power reduction is sensed by the power connector. Alternatively, as exemplified in FIGS. 5, 7A and 7B, an activation power or current adjuster, such as a thumbwheel adjuster, may be added to the power connector next to a time switch to set a current or power value to activate the self unplugging of the power connector. For all the power connectors described above, a power connector ejection or release speed may be less than about 5 cm/s, or in a range of about 0.1-1 cm/s or about 0.1-0.2 cm/s. The self unplugging action of the power connector of the present invention, whether it is a power plug or a power plug adapter, may take place in a controlled speed or a reduced speed so that the power connector gently moves away from an electrical outlet and gets electrically disconnected without getting rapidly ejected. By controlling the speed of the unplugging of the power connector and enabling it to unplug at a reduced speed, the power connector may still be physically attached to the outlet while it is disconnected electrically, which prevents the power connector from falling on the ground and thus getting damaged. This may allow a user to remove the power connector easily from the electrical outlet without taking any extra effort to pull the power connector or its cord.

Figure 8A:
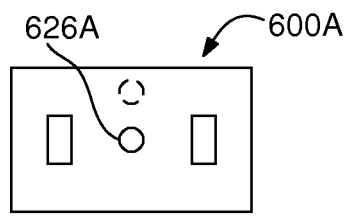
FIGS. 8A-8D are schematic bottom plan views of various power connectors having different release members.
Figure 8B:
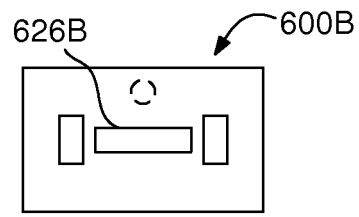
Figure 8C:
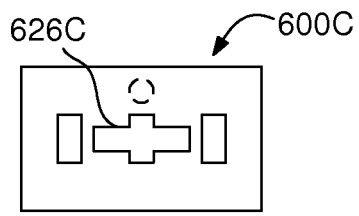
Figure 8D:
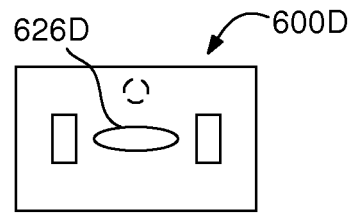

FIGS. 8A-8D show in bottom plan view of power connectors 600A-600D including exemplary release members 626A-626D respectively. Accordingly, in FIG. 8A a release member 626A may be a pin or shaft, as also shown in the above embodiments. Although the pin is shown round, it may have any cross-sectional geometries, such as square, rectangular, or octagonal, etc. In certain embodiments, the body of the release member may be a shaft or pin but the tip of the release member may be a small plate having different geometries as shown in FIGS. 8B-8D. FIG. 8B shows a release member with a rectangular tip 626B. FIG. 8C shows a release member with a cross-shaped tip 626C. FIG. 8D shows a release member with an oval tip 626D.

In another embodiment, the present invention provides an electromechanical power manager to control power to a device having batteries or to a load device. The electromechanical power manager may be configured to shut power off when the batteries are fully charged. The electromechanical power manager may be an electromechanical power connector device or electromechanical power connector for supplying external power for batteries of devices, which may or may not be portable devices, such as cell phones, tablets, computers and the like. The electromechanical power connector may connect an external power source, i.e., a power outlet, to a power adapter or charge adapter which supplies power to charge, for example, rechargeable batteries of the device. The external power from the external power source may flow to the power adapter via terminals of an electromagnetic switch or relay within the electromagnetic power connector. The terminals of the electromagnetic switch may include contacts configured to place the electromagnetic switch in on and off states, thereby allowing or disallowing the external power to flow from the external power source to the power adapter.

A power sensing circuit within the electromechanical power connector may be coupled between the terminals of the electromagnetic switch and the power adapter. The power sensing circuit is configured to deactivate the electromagnetic switch to place the electromagnetic switch in off-state, when the power sensing circuit detects a predetermined amount of reduction in the external power drawn by the batteries, so that no external power flows to the power adapter, and thereby standby power losses are prevented.

The reduction in power indicates that the rechargeable batteries are fully charged. When the electromagnetic switch is placed in off-state, the contacts are mechanically opened and disconnect the electrical connection between the external power source and the power adapter. Since the contacts are open, no external power can be drawn by the power adapter and thus no standby power is consumed by the power adapter. Unplugging the electromechanical power connector from the power outlet also deactivates the electromagnetic switch. When the rechargeable batteries are needed to be charged again, a reset mechanism activated by a reset button is configured to mechanically close the contacts of the electromagnetic switch, thereby placing the electromagnetic switch in on-state. When the electromagnetic switch or the relay is in on-state, the electrical connection between the external power source and the power adapter is reestablished to charge the rechargeable batteries of the device. Accordingly, the electromechanical power connector device may be built as a single device containing the electromagnetic switch and the power sensing circuit. Alternatively, the electromagnetic power connector device may be integrated with a charge adapter device within the same housing and thereby forming a single device including both devices.

In FIG. 9A, a power connector 1000 is shown connected to an external power source 1002, such as a power outlet or wall outlet by an electrical plug 1004 and a power cord 1005 extending between the power connector 1000 and the plug 1004. A power adapter 1006 or charge adapter may be in turn electrically connected to both the power connector 1000 using a plug 1008A and a load 1010 using a plug 1008B. The power adapter 1006 may supply the power received through the power connector 1000 to the load 1010 such as a rechargeable battery or a battery pack of a device 1012, for example, a laptop computer to charge the rechargeable battery 1010. The power adapter 1006 may be an AC/DC adapter converting AC power into DC power which is needed to charge the recharge battery 1010. It is understood that the power received by the power adapter 1006 from the power connector 1000 is AC power; however, the power supplied from the power adapter 1006 to the rechargeable battery 1010 is DC power. The power connector 1000 may shut off the power from the external power source 1002 to the power adapter 1006 when the power connector detects a reduction in power drawn by the load, which indicates that the charging of the rechargeable battery 1010 is complete. This prevents standby power loses. The power connector 1000 may also include a power reset button 1014 and a power adjustment switch 1016. The power adjustment switch 1016 may be used for presetting a power range or power ranges to shut off power to the power adapter. The power reset button 1014 may be used to mechanically turn on the power when needed.

FIG. 9B shows an alternative embodiment of a power connector 2000 including a power connector module 2020A and a power adapter module 2020B. The power connector module 2020A and the power adapter module 2020B are electrically connected within a housing 2022 of the power connector 2000 at an interface 2024. In this embodiment, the power connector module 2020A and the power adapter 2020B of the power connector 2000 may function the same way as the power connector 1000 and the power adapter 1006 shown in FIG. 9A, respectively.

FIG. 10A shows the power connector 1000 plugged into the power outlet 1002 or wall outlet. The power connector 1000 may comprise a housing 1020 having a first end 1022A and a second end 1022B. The housing 1020 includes an electromagnetic switch 1026 or relay and a power sensing circuit 1028 therein. The power cord 1005 is attached to the first end 1022A of the housing 1020 and connects the power connector 1000 to the power outlet 1002. At least two power receptacles 1024A and 1024B may be located at the second end 1022B of the housing 1020 to receive electrical conductors 1027A and 1027B or prongs of the plug 1008A of the power adapter 1006 (FIG. 9A). Power wires L1 and L2 or lines extend from the power receptacles 1024A and 1024B to the power cord 1005 and continue to the plug 1004.

Contacts 1030A and 1030B of the electromagnetic switch 1026 are connected to the power wires L1 and L2 at terminals T1 and T2 of the contacts 1030A and 1030B. A coil 1032 of the electromagnetic switch may be electrically connected to the power sensing circuit 1028 that may be configured to control the electromagnetic activity of the coil 1032. The power sensing circuit 1028 may also be connected to the power wires L1 and L2 and configured to detect any power drop indicating that the charging operation is completed. In operation, when a power drop is detected by the power sensing circuit 1028, the power sensing circuit induces the coil 1032 of the electromagnetic switch 1026 so that the contacts 1030A and 1030B are opened with an electromagnetic action. This cuts off the power flow to the power adapter 1006 (FIG. 9A) via the power wires L1 and L2, and hence deactivates the power connector 1000.

In order to restart the power flow to the power adapter, in other words in order to activate the power connector 1000, the power reset button 1014 may be pressed by a user to mechanically operate a reset mechanism 1034 to mechanically close the contacts 1030A and 1030B. Once the contacts 1030A and 1030B are closed within the power connector 1000, a power flow from the external power source 1002 to the power adapter 1006 is reestablished to start charging the rechargeable battery 1010 of the device 1012 (FIG. 9A). Although in this embodiment, the reset mechanism 1034 may be manually activated or operated by a mechanical activity of the reset button 1014 used by a user, in another embodiment, a reset mechanism may be a part of a remote control system and may be remotely operated by a wireless signal sent by a remote control device of this control system used by a user, and this is within the scope of this invention. The power adjustment switch 1016 may be used for presetting a predetermined power range or value in electrical power (Watt) units or a predetermined current range or value in electrical current (Ampere) units so as to shut off power to the power adapter 1006 when that range or value is detected by the current sensing circuit 1028.

Figure 10B:
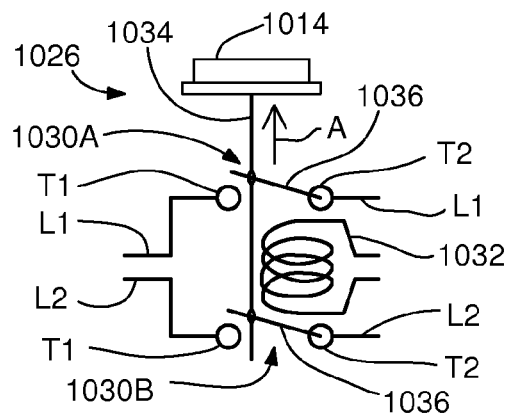
FIG. 10B is a schematic illustration of the electromagnetic switch shown in FIG. 10A, wherein the electromagnetic switch has been placed in off-state.
Figure 10C:
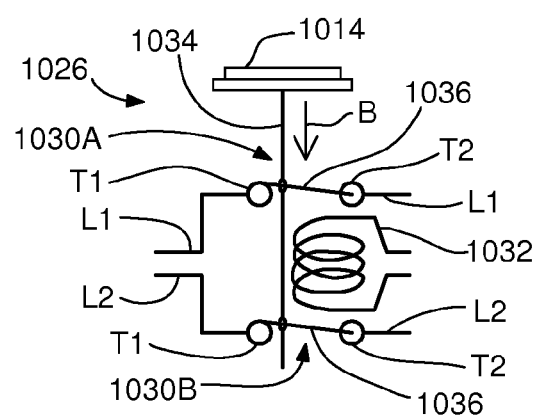
FIG. 10C is a schematic illustration of the electromagnetic switch shown in FIG. 10A, wherein the electromagnetic switch has been placed in on-state by resetting the switch mechanically.

FIGS. 10B and 10C show the electromagnetic switch 1026 in an off-state and an on-state respectively. Referring to FIG. 10B, when the electromagnetic switch 1026 is in the off-state, the contact elements 1036 do not connect terminals T1 and T2, thereby the contacts 1030A and 1030B are open. Neither physical connection nor electrical connection between the terminals T1 and T2 exist when the electromagnetic switch 1026 is in the off-state. Referring to FIG. 10C when the electromagnetic switch 1026 is in the on-state, the contact elements 1036 connect terminals T1 and T2, thereby the contacts 1030A and 1030B are closed. Both physical connection and electrical connection are established between the contacts T1 and T2 when the electromagnetic switch 1026 is in the on-state. The contacts 1030A and 1030B may be mechanically closed by pushing the contact elements 1036 downwardly in the direction of arrow 'B' by the reset mechanism 1034 manually activated by the reset button 1014. In this respect, the electromagnetic action of the electromagnetic switch 1026 may push the contact elements 1036 upwardly in the direction of arrow 'A' to open the contacts 1030A and 1030B as shown in FIG. 10B.

Figure 11:
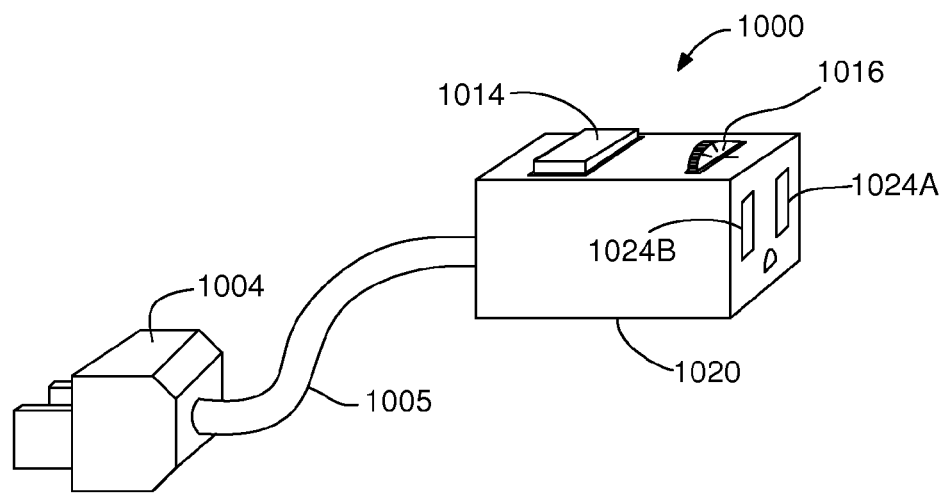
FIG. 11 is a schematic perspective view of the power connector shown in FIG. 10A.

FIG. 11 shows an exemplary perspective view of the power connector 1000 having both the power reset button 1014 and the power adjustment switch 1016 on the connector housing 1020. FIG. 11 also shows the power cord 1005, the plug 1004 and at least two power receptacles 1024A and 1024B of the power connector 1000.

For example, if a current needed to charge the battery 1010 of the device 1012 is a first current having X amperes, a reduced current or a second current having Y amperes, which is detected by the current sensing circuit 1028 to deactivate the relay 1026 to cut off the current, may be of about less than 100% of the first current value X, or in the range of about 1%-10% of the first current value X. A typical range of power reduction for the deactivation of the electromagnetic switch to shut off the power may be in the range of about 10-500 mW, about 30-500 mW, or about 10-50 mW, depending on the appliance and charging current. Such power connectors having power sensing circuits with a predetermined power value to control the relay to cut off power to a power adapter may be designed in for dedicated products, such as laptops or mobile phones. Such power connectors cut off power to the power adapter when the predetermined power value or power reduction is detected by the power connector. Alternatively, the power adjusting switch of the power connector may be used to set a desired current or power value to shut off the power when this power value is detected by the current sensing circuit.

Figure 12:
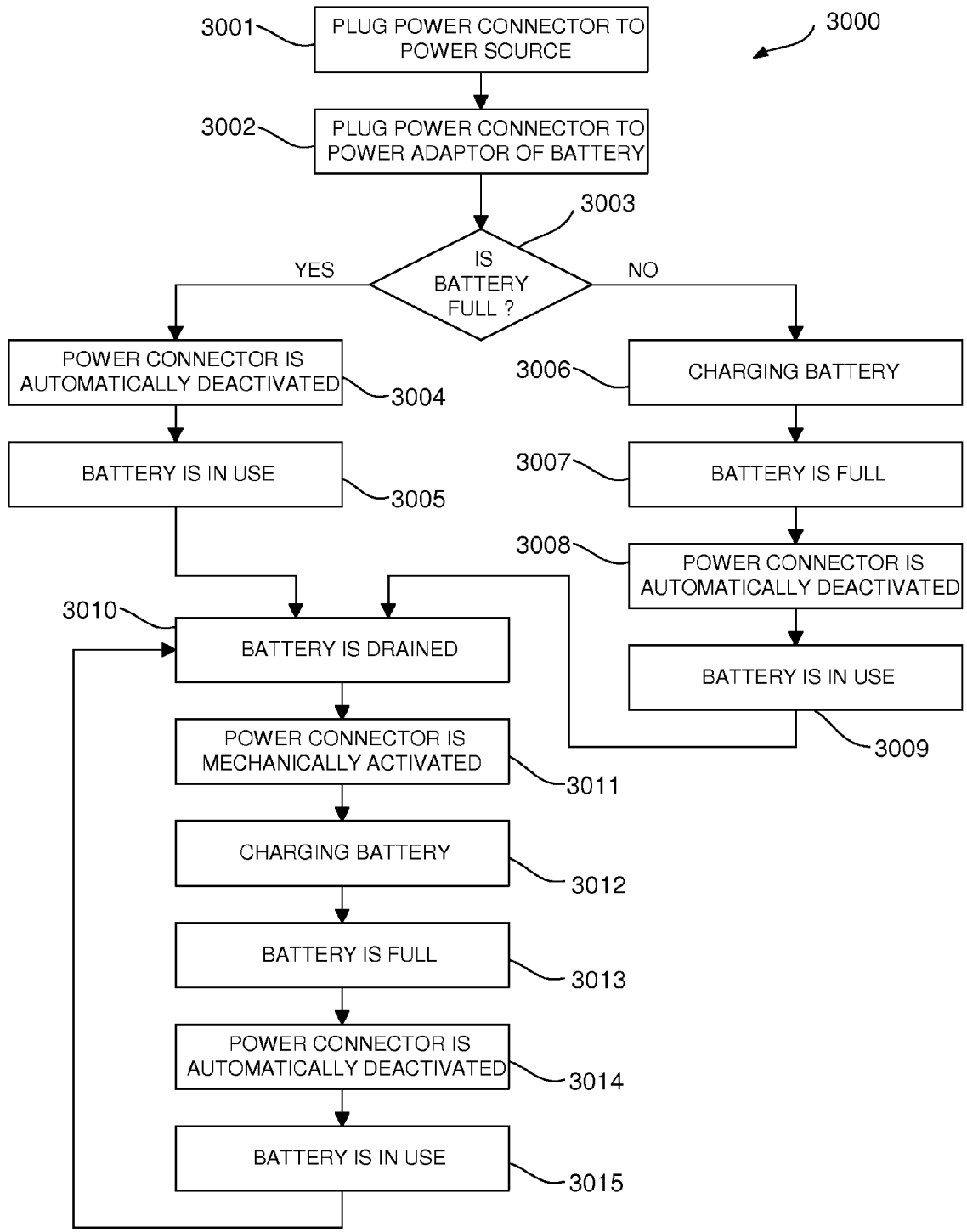
FIG. 12 is a flow chart illustrating a method of the present invention.

FIG. 12 is a flow chart 3000 describing an embodiment of an exemplary method of using the power connector 1000 of the present invention to charge the battery 1010 of the device 1012. In steps 3001 and 3002 of the exemplary method, the power connector 1000 FIGS. 9A, 10A-11) may be plugged into the power outlet 1002 and then connected to the power adapter 1006 which is connected to the device 1012 having the battery 1010 to charge. The power connector 1000 may have been already activated as described above, i.e., placed in on-state, or it may be activated after plugging into the power outlet 1002. In step 3003, the power sensing circuit 1028 may determine whether the battery 1010 is fully charged or not. If the battery 1010 is fully charged, i.e., a power drop is detected by the power sensing circuit 1028, the power connector 1000 is deactivated. Next, the battery 1010 can be used to run the device 1012 as indicated in step 3005. If the battery 1010 is not fully charged in step 3003, i.e., no power drop is detected by the power sensing circuit 1028, the charging of the battery 1010 may start or continue as indicated in step 3006. As indicated in steps 3007, 3008 and 3009 respectively, when the battery 1010 is fully charged, the power connecter 1000 may be deactivated and the battery can be used to run the device 1012. After either step 3005 or 3009, as indicated in step 3010, the battery 1010 may be drained while using the device 1012. As shown in step 3011, the power connector 1000 may be mechanically activated by a user to start the power connector to charge the battery 1010 as indicated in step 3012. As indicated in steps 3013, 3014 and 3015 respectively, when the battery 1010 is fully charged once again, the power connecter 1000 may be deactivated and the battery 1010 can be used to run the device 1012, which continues until the battery 1010 is drained in step 3010.

Although aspects and advantages of the present invention are described herein with respect to certain preferred embodiments, modifications of the preferred embodiments will be apparent to those skilled in the art. Thus the scope of the present invention should not be limited to the foregoing discussion, but should be defined by the appended claims.

I claim:

1. An electromechanical connector for use in charging batteries of devices, comprising:
    an electromagnetic switch having terminals used to supply AC power from an external AC power source to an AC/DC power adapter which is connected to a battery of a device so as to supply DC power to charge the battery, wherein the terminals include contacts;
    a power sensing circuit configured to track AC power supplied from the external AC power source to the AC/DC power adapter, the power sensing circuit being coupled between the terminals of the electromagnetic switch and the AC/DC power adapter, wherein the power sensing circuit is configured to open the contacts of the electromagnetic switch to shut off AC power supplied to the AC/DC power adapter when the power sensing circuit detects an indication in AC power that the battery is fully charged, wherein when the contacts of the electromagnetic switch are opened, the power sensing circuit is physically and electrically disconnected from the external AC power source; and
    a reset mechanism configured to mechanically close the contacts of the electromagnetic switch to start supplying AC power to the AC/DC power adapter.

2. The electromechanical connector of claim 1, wherein the electromagnetic switch, the power sensing circuit and the AC/DC power adapter are disposed in a connector housing.

3. The electromechanical connector of claim 1, wherein the electromagnetic switch and the power sensing circuit are disposed in a connector housing, and the AC/DC power adapter is disposed in an adapter housing.

4. The electromechanical connector of claim 1, wherein the indication comprises detecting an AC power reduction from a first AC power value to a second AC power value.

5. The electromechanical connector of claim 4, wherein the second AC power value is about 1%-10% of the first AC power value.

6. The electromechanical connector of claim 4 further comprising a power adjustment switch for preselecting the second AC power value.

7. A system for supplying electrical power to a device having a battery, comprising:
    a connector supplying AC power from an external AC power supply to an AC/DC power adapter that supplies DC power to charge the battery within the device;
    an electromagnetic switch within the connector, the electromagnetic switch being configured to shut off AC power received by the AC/DC power adapter when the electromagnetic switch is opened;
    a control circuit within the connector, the control circuit configured to track AC power supplied from the external AC power supply to the AC/DC power adapter, wherein the control circuit is configured to open the electromagnetic switch when the control circuit detects a reduction in AC power from a first AC power value to a second AC power value, the reduction in AC power indicating that the battery is fully charged, wherein when the electromagnetic switch is opened, the control circuit is physically and electrically disconnected from the external AC power supply; and
    a reset mechanism of the connector to close the electromagnetic switch to supply AC power to the AC/DC power adapter when the battery needs to be charged.

8. The system of claim 7, wherein the second AC power value is less than 100% of the first AC power value.

9. The system of claim 7, wherein the second AC power value is about 1%-10% of the first AC power value.

10. The system of claim 7 further comprising a power adjustment switch for selecting a predetermined second AC power value to shut off AC power supplied to the AC/DC power adapter from the power connector.

11. The system of claim 7, wherein the reset mechanism is remotely operated by a wireless signal sent from a remote control device activated by a user.

12. The system of claim 7, wherein the reset mechanism is manually operated by a reset button mechanically activated by a user.

13. A method for supplying electrical power to a device having a battery, comprising:
    charging the battery using DC power from an AC/DC power adapter external to the device, wherein the AC/DC power adapter is supplied AC power by a connector located between an external AC power source and the AC/DC power adapter;
    tracking AC power supplied from the external AC power source to the AC/DC power adapter using a power sensing circuit located within the connector;
    detecting a reduction in AC power received from the external AC power source using the power sensing circuit, the reduction in AC power indicates that the charging of the battery is completed;
    opening an electromagnetic switch within the connector using the power sensing circuit in response to the reduction in AC power so as to disconnect the AC/DC power adapter from the external AC power source, wherein opening the electromagnetic switch physically and electrically disconnects the power sensing circuit from the external AC power source; and mechanically closing the electromagnetic switch so as to connect the AC/DC power adapter to the external AC power source.

14. The method of claim 13, wherein detecting the reduction in AC power occurs when the electrical connection between the connector and the device is terminated.

15. The method of claim 13, wherein detecting the reduction in AC power occurs when the battery is fully charged.

16. The method of claim 13, wherein detecting the reduction in AC power detects an AC power reduction in a range of about 30 mW-500 mW.

17. The method of claim 13, wherein opening the electromagnetic switch opens electrical contacts of the electromagnetic switch with an electromagnetic effect.

* * * * *